March 26, 1968  
H. D. KAUFFMAN  
3,375,432  
CONTROL CIRCUIT FOR REGULATING THE VOLTAGE OF AN A.C. GENERATOR  
Filed June 14, 1965  
2 Sheets-Sheet 2

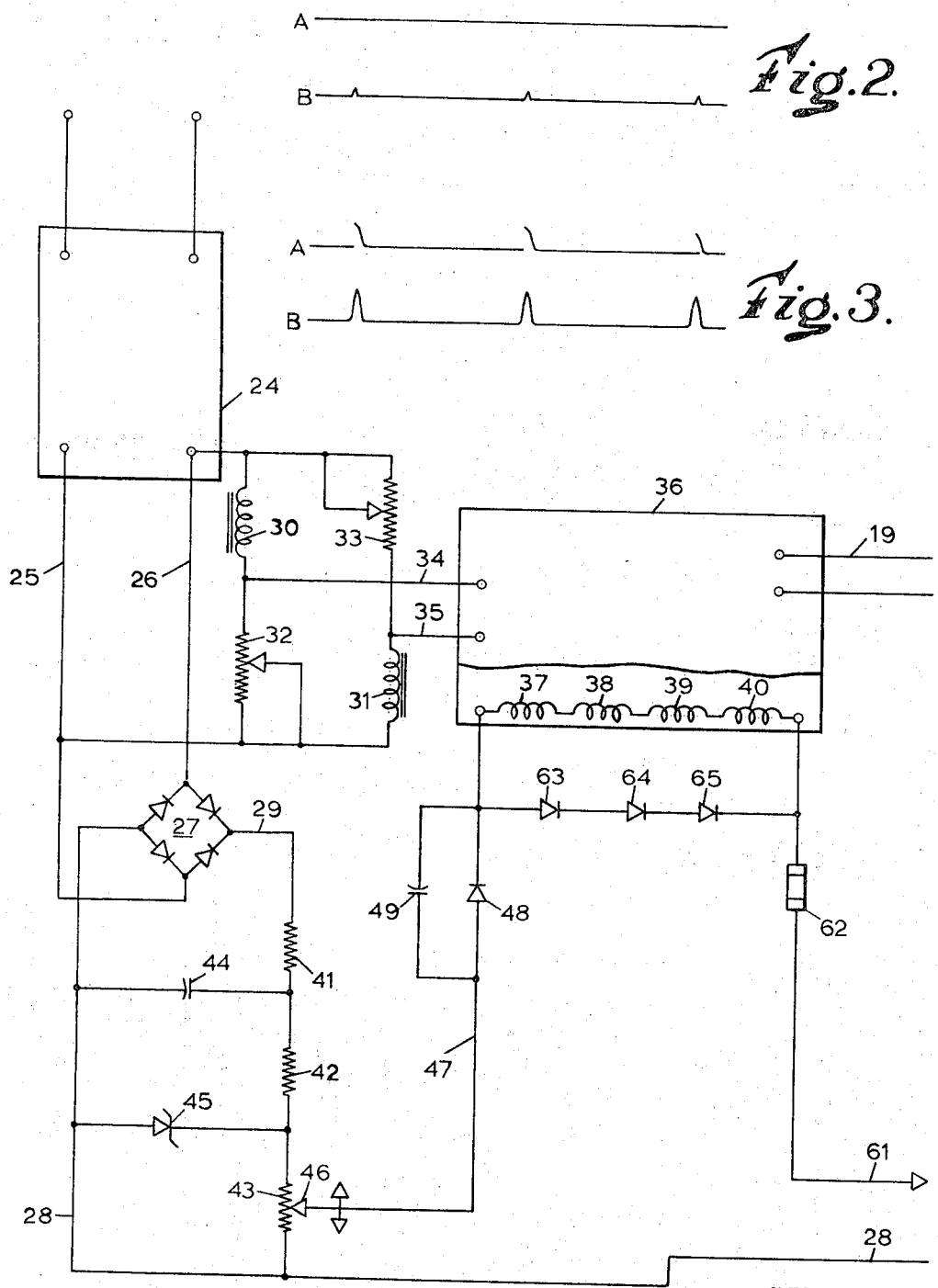

United States Patent Office 3,375,432
Patented Mar. 26, 1968

3,375,432
CONTROL CIRCUIT FOR REGULATING THE
VOLTAGE OF AN A.C. GENERATOR
Harry D. Kauffman, Cincinnati, Ohio, assignor, by mesne assignments, to Park-Ohio Industries, Inc., a corporation of Ohio
Filed June 14, 1965, Ser. No. 463,737
3 Claims. (Cl. 322—28)

ABSTRACT OF THE DISCLOSURE

There is provided a control circuit for regulating the energization of the field winding of a motor-generator set from a source of pulsating direct current having a series of repetitive pulsations. This control circuit includes a silicon controlled rectifier connected in series with the field winding; a gate pulse generator having an output signal train and pulses with leading portions; means for applying the pulses to the rectifier for controlling the conduction thereof and the current flow through the winding; means for producing a selected command signal proportional to a desired voltage output from the motor driven generator; means for producing a feed back signal from the generator proportional to the voltage output therefrom; means for comparing the command and feed back signals for controlling the gate pulse generator to adjust the position of the leading portions of the pulses generated thereby in direct response to the difference between the command and feed back signals; a source of reference alternating current connected to the pulse generator for timing the occurrence of the pulses; and, means for adjusting the phase of the reference alternating current to align the pulse occurrence with the pulsations of the direct current power source.

Disclosure

This invention relates to motor driven generators to produce power for specialized industrial applications and more particularly to a control circuit especially suited to provide very accurate control of the voltage output from the generator.

Motor generator sets are used extensively in specialized applications such as induction heating where it is required that close regulation of the output voltage be obtained to produce acceptable repeatability and uniform heating of workpieces on a production basis. This regulation of voltage is achieved by control of the excitation windings of the generator and common systems employ magnetic amplifier circuits for effecting this control. Magnetic amplifiers have a relatively slow response time and therefore are not particularly suited for use in systems where it is desired to have a short cycle time and high power output. Silicon controlled rectifiers have been used in some industrial applications with success although the accuracy of the resulting regulation has not been as good as is required in some equipment. These devices are inherently faster in response and therefore should produce better regulation in short cycle induction heating operations if desired accuracy can be obtained. Accordingly it is an object of this invention to provide a motor generator control circuit for use in an apparatus such as an induction heating unit which circuit effectively employs a silicon controlled rectifier to regulate the excitement of the generator field to extremely close tolerances.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the preferred form, this invention is combined in a system for the control of the power input to the field windings of a motor driven generator. The field supply includes a silicon controlled rectifier operating in a circuit of direct current voltage obtained from a full wave rectification of an alternating current power supply. The controlled rectifier is gated in a proportional power regulation mode of operation to regulate the field power input. A feedback signal is taken from the generator output and is compared with a preset control signal to produce an error signal in a pulse generator, the output of which is in the form of pulses that gate the silicon controlled rectifier on to conduct. The pulse width varies in direct proportion to the error signal. A relatively constant reference source of alternating current is provided and a phase shifting network is also included with means for adjusting the phase of the reference alternating current to provide synchronization of the gate pulses with the pulsations of the direct current input to the silicon controlled rectifier. The result is a very accurate regulation of the output voltage from the motor driven generator combined with the advantages of easy adjustability and fast response. A clear understanding of the invention can be obtained from the following detailed description in which reference is made to the attached drawings wherein:

FIGS. 1a and 1b are a wiring diagram of the control circuit of this invention.

FIGS. 2, 3, 4 and 5 are reproductions of oscillographic charts showing the results obtained from the circuit of FIG. 1 in the control of field power of a motor generator in which the control is shown at various levels from zero power to a maximum power, respectively.

Figure 1B:
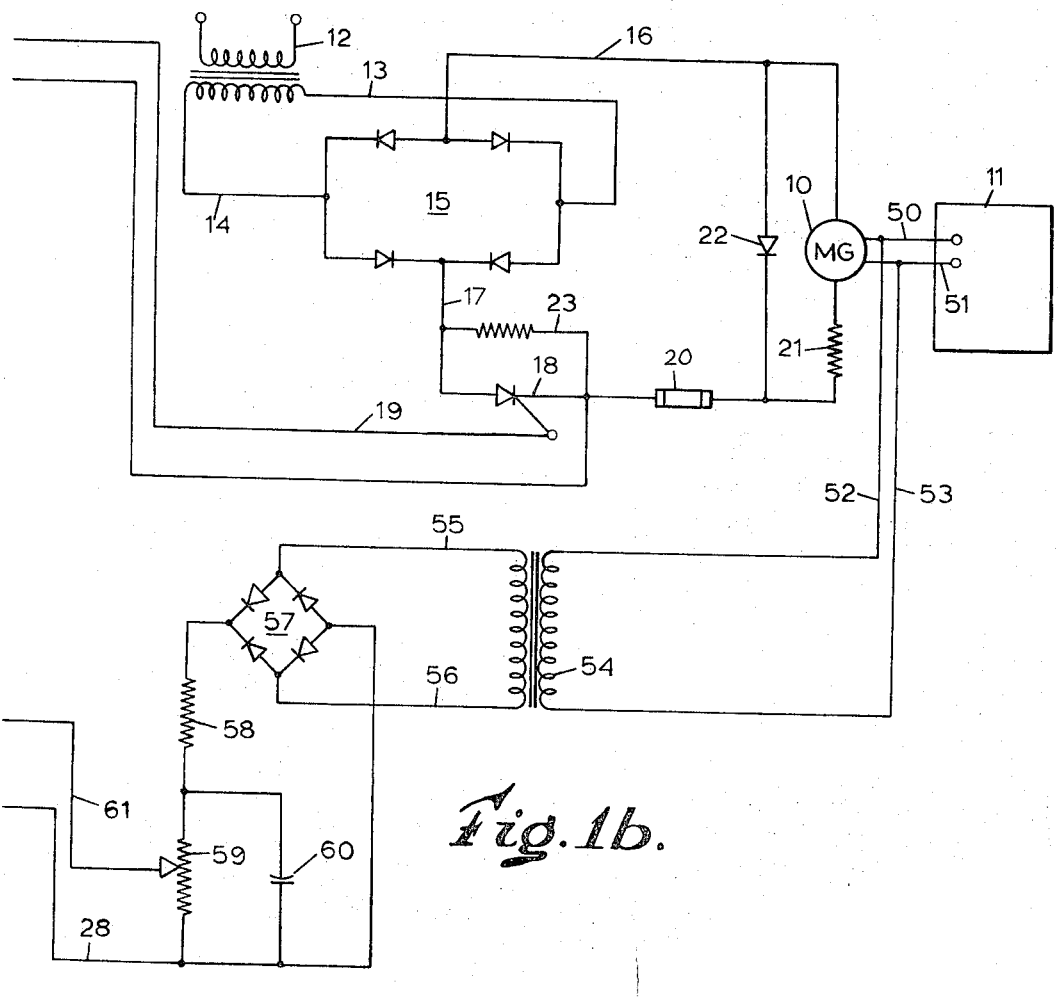

There is shown in FIGS. 1a and 1b an exciter control circuit by which the output power of a motor generator 10 is accurately controlled. The motor generator 10 supplies high frequency alternating current to an inductive load such as a coil of an induction heating device 11, devices of this type being well known in the art and therefore not shown in detail herein. A power input transformer 12 supplies the energy by which the field of the generator 10 is energized. The output of the transformer 12 is an alternating current which is connected by power lines 13, 14 as an input to a full wave bridge rectifier circuit 15. The output from the rectifier 15 is supplied on lines 16 and 17. The negative direct current line 16 is connected directly to the field of the generator 10. The positive line 17 is connected to the anode of a silicon controlled rectifier 18 which is a device well known in the art and which operates like a gated diode, that is, it is caused to be turned on to conduct by a gate signal which, in the circuit shown, is supplied to the rectifier 18 on a conductor 19. When the silicon controlled rectifier 18 is turned on, a positive direct current is connected through a fuse 20 and resistance 21 to the other end of the field winding in the generator 10. The fuse 20 is a current limiting device to protect the field circuit of the generator 10. The resistance 21 is included to cause the proper voltage to be applied to the field of the generator 10 and to limit the current therethrough to a steady state when the field is saturated. A free wheeling diode 22 is connected across the field input to the generator 10 to dissipate energy stored in the field when the input thereto is turned off by the controlled rectifier 18. A shunt resistance 23 is connected across the rectifier 18 to protect that device from high transient signals that might otherwise cause damage to it.

Figure 4:
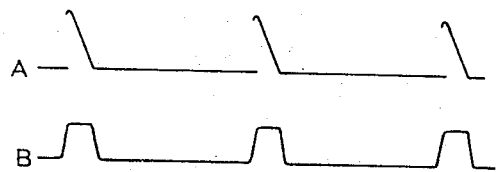
Figure 5:
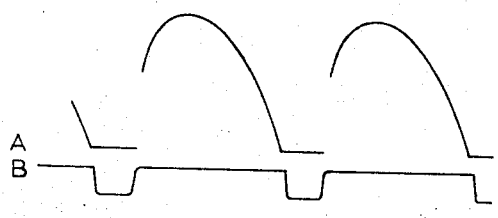

The balance of the circuit shown in FIGS. 1a and 1b is provided to deliver the gate signals to the conductor 19 so that the output from the generator 10 is very accurately controlled. The control technique in this case can be termed a proportional control by which the gate signal supplied to the rectifier 18 is caused to turn the rectifier 18 on to conduct more or less of the pulsating direct current cycles which are output from the rectifying bridge 15. These direct current cycles are positive cycle pulsations of direct current which result from the full wave rectification of the alternating input to the bridge rectifier 15, there being two of them for each full alternating current cycle input to the bridge rectifier 15. FIGS. 2–5 illustrate the affect of the control pulses supplied by the gate conductor 19. In each of the figures, the line B represents an oscillograph of the gate pulse and the line A is a similar showing of the output of the controlled rectifier 18. As can be seen in FIG. 2, there is no output from the rectifier 18 when the pulses on the line 19 are at a minimum. In FIG. 3 a slightly wider pulse produces a small output current from the rectifier 18, this output being at the trailing portion of each half cycle pulse input to the rectifier 18 from the bridge 15. In FIG. 4, the gate pulses are of a medium width and a greater portion of half cycle pulsations are output from the rectifier 18. In FIG. 5 a maximum gate pulse width is shown and approximately the last eighty percent of the direct current cycle input is output from the rectifier 18. Therefore in these figures, there is illustrated a controlled power output from the rectifier 18 which can be varied from zero to eighty pecent of the power available from the bridge 15.

The control portion of the circuit in FIG. 1 includes a conventional constant voltage transformer unit 24 which produces an accurately controlled alternating current output on conductors 25, 26 which are the input lines to a full wave bridge rectifier 27. An output reference direct current voltage is produced from the bridge 27 across conductors 28, 29. The alternating current output on the lines 25, 26 is also connected to a lagging phase shift network comprised of the parallel chokes 30, 31 and resistance potentiometers 32, 33. The network is adjustable by means of the potentiometers. An alternating current of selectively adjusted phase is supplied on power lines 34, 35 to a bridge type pulse generator circuit 36. The circuit 36 is a circuit such as is commercially available from the Vectrol Engineering Division of Sprague Electric Company and sold under their trademark "Silicontrol" to designate the bridge gate drive package. This gate drive circuit employs the saturable core reactor features shown and described in U.S. Patent 2,524,759 issued Oct. 10, 1950 to Walter J. Brown. It produces a pulse train output timed in relation to the reference alternating current input on the lines 34, 35 and the width of the pulses is determined by the direct current voltage across the windings 37–40 of the saturable core reactor included in the circuit unit 36.

The reference direct current from the rectifier bridge 27 is connected across a voltage divider including resistances 41–43, this divider being supplied with a transient filter capacitor 44 and having a Zener diode 45 connected in parallel with the resistance 43 which is an adjustable multi-turn potentiometer. The wiper 46 of the potentiometer picks off an accurately controlled direct current reference signal which is connected by way of a conductor 47 and a diode 48 to one end of the saturable core reactor winding 37. A ripple filter 49 is provided in parallel with the diode 48. The diode 48 provides reverse condutcion protection in the circuit by preventing reverse current flow since the saturable reactor windings 37–40 are not senstive to the direction of current flow but only to the amount.

A feedback signal is connected to the reactor winding 40 and this signal is obtained from the output of the generator 10. The high frequency output lines 50, 51 are tapped by conductors 52, 53 which connect the output voltage across an isolating transformer 54. The transformed alternating current signal is connected by means of conductors 55, 56 to a full wave bridge rectifier 57. The direct current feedback signal from the bridge rectifier 57 is applied across a divider network including the resistance 58 and resistance potentiometer 59. A capacitor 60 supplies transient suppression in the signal developed across the potentiometer 59. The direct current feedback signal is picked off from the potentiometer 59 by its wiper 61 and connected directly to the winding 40 through a fuse 62 which provides forward conduction protection. The difference in potential signals at the potentiometer wipers 46 and 61 is the error signal which results in the control of the pulse width of the gate signals that are output from the bridge pulse generator circuit 36 and which are applied on the line 19 to the controlled rectifier 18.

At the initial start-up of the generator 10, a large error signal can occur which might result in damage to the pulse generator circuit 36. Therefore a shunt circuit is supplied across the windings 37–40 in the form of a series of diodes 63–65 each of which has a predetermined avalanche voltage at which it begins to conduct freely. The total avalanche voltage across the series of diodes 63–65 is greater than the normal error signal but less than the signal which occurs during start-up of the generator 10. The avalanche voltage across the diodes 63–65 is not so high as to risk damage to the circuit 36 before the diodes 63–65 all begin to conduct and when they do conduct, the voltage across them drops to a level close to the normal operating range of the circuit. The fuse 62 prevents excessive current from being conducted through the diodes 63–65 for too long a period should the generator voltage and output not come up sufficiently fast.

Once the generator 10 is in operation, the control circuit will achieve a balance such that the pulse width of signals on the line 19 will maintain a desired output power level from the generator 10 to the heater unit 11 and the error signal will settle at a constant level to maintain this. The power level adjustment is made by adjustment of the wiper 46. The power level from the generator 10 is directly proportional to the level of the signal tapped off by the wiper 46. The phase shift network including chokes 30, 31 and resistances 32, 33 can be adjusted so that the gate pulses from the circuit 36 occur at exact phase synchronism with the pulsations of the input to the controlled rectifier 18 to insure that no erratic firing of the rectifier occurs. The phase shift network provides the element of adjustment in the control circuitry which allows a more accurate control for proportional power control than has been heretofore available. In tests of a circuit as described, it has been found that under normal operating conditions the circuit and generator will provide a voltage regulation of plus or minus one-half percent maximum variation of base generator voltage in a ten ampere, two-hundred-fifty kilowatt generator induction heating application.

What is claimed is:

1. A control circuit for regulating the energization of the field winding of a motor driven generator from a source of pulsating direct current having a series of repetitive pulsations comprising in combination:
   (a) a silicon controlled rectifier connected in series with the field winding,
   (b) a gate pulse generator having an output signal train of pulses with leading portions,
   (c) means for applying said pulses to the rectifier for controlling the conduction therethrough and the current flow though said winding,
   (d) means for producing a selected command signal proportional to a desired voltage output from the motor driven generator,
   (e) means for producing a feedback signal from the generator proportional to the voltage output therefrom,
   (f) means for comparing said command and feedback signals and for controlling said gate pulse generator to adjust the position of the leading portions of said pulses generated thereby in direct response to the difference between said signals, (g) a source of reference alternating current connected to said gate pulse generator for timing the occurence of said pulses, and (h) means for adjusting the phase of said reference alternating current to align said pulse occurence with the pulsations of the direct current power source.

2. The circuit apparatus of claim 1 wherein:
(a) said means for comparing is a saturable core reactor winding included in said gate pulse generator, and
(b) said feedback and command signals are connected, respectively, to one end and the other of said reactor winding.

3. The circuit apparatus of claim 2 wherein:
(a) a series of diodes are connected in parallel with said reactor winding and have a predetermined total avalanche voltage level thereacross to protect said reactor winding from excessive current therethrough when an excessive error signal occurs.

References Cited
UNITED STATES PATENTS 3,154,733 10/1964 Pratt _____ 322—28
3,214,599 10/1965 Wellford _____ 322—28

MILTON O. HIRSHFIELD, *Primary Examiner.*

R. V. LUPO, *Assistant Examiner.*